Figure 1:
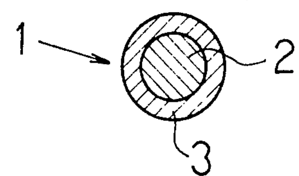

5/24/85 OR 4,542,957

United States Patent [19]

Ishiwari et al.

[11] Patent Number: 4,542,957

[45] Date of Patent: Sep. 24, 1985

[54] PLASTICS OPTICAL FIBERS

[75] Inventors: Kazuo Ishiwari; Akira Ohmori, both of Ibaraki; Nobuyuki Tomihashi, Takatsuki; Sumiko Yuhara, Settsu; Toshikuni Kaino; Kaname Jinguji, both of Mito; Shigeo Nara, Mito, all of Japan

[73] Assignees: Nippon Telegraph and Telephone Public Corporation, Tokyo; Kaikiu Kogyo Co. Ltd., Osaka, both of Japan

[21] Appl. No.: 522,260

[22] Filed: Aug. 11, 1983

[30] Foreign Application Priority Data

Aug. 13, 1982 [JP] Japan ............................... 57-139803

[51] Int. Cl.$^{4}$ ............................................ G02B 5/172

[52] U.S. Cl. ............................... 350/96.34; 350/96.30

[58] Field of Search ........................... 350/96.30, 96.34

[56] References Cited

U.S. PATENT DOCUMENTS 3,930,103 12/1975 Chimura et al. ............... 350/96.3 X 4,381,269 4/1983 Kaino et al. ................... 350/96.3 X

*Primary Examiner*—John Lee

*Assistant Examiner*—Lester Rushin

*Attorney, Agent, or Firm*—Larson and Taylor

[57] ABSTRACT

Plastic optical fibers comprising as a core component a polymer predominantly containing methyl methacrylate and as a cladding component a copolymer lower in the refractive index than the core component, the plastics optical fibers being characterized by performing conjugate spinning with use of the cladding component which is vinylidene fluoride-tetrafluorethylene copolymer having incorporated therein 5 to 50% by weight of a polymer predominantly containing methyl methacrylate.

2 Claims, 2 Drawing Figures

1 2 3

PLASTICS OPTICAL FIBERS

This invention relates to plastics optical fibers and particularly to plastics optical fibers having outstanding light-transmitting property and comprising as a core component a polymer predominantly containing methyl methacrylate and as a cladding component a synthetic high molecular weight copolymer composition lower in refractive index than the core component.

Heretofore well known as plastics optical fibers are those which comprise as a core component a synthetic high molecular weight material excellent in transparency, such as polystyrene or polymethyl methacrylate and as a cladding component a synthetic high molecular weight material lower in the refractive index than the core component, the core and cladding components being concentrically assembled to form a composite optical fiber so that incident light introduced from one end of the optical fiber are subjected to total reflection and transmitted in lengthwise direction through the optical fiber.

In the manufacture of this kind of plastics optical fibers, consideration should be taken to minimize the factors, such as the absorption or scattering of light, which are responsible for reduction in amount of light rays transmitted through the optical fiber.

Optical fibers prepared by use of a synthetic high molecular weight material, namely plastics optical fibers, have the features of being lightweight, ductile and easy to be high in the numerical aperture, as compared with optical fibers produced from inorganic glass, but the plastics optical fibers have the disadvantage of large transmission loss as compared with the glass optical fibers. Today it is desired to lower the transmission loss of a plastic fiber of light rays transmitted through a plastics optical fiber prepared from a synthetic high molecular weight material.

To our knowledge, the light transmission loss of plastics optical fibers is caused by the scattering of light occurring due to impurities and dust contained in the synthetic high molecular weight material and micro voids formed in the optical fiber and also by the absorption and/or scattering of light which occurs in the cladding while the rays of light undergo total reflection in the interface between the core and the cladding during light transmission. A cladding component which is crystalline and opaque is likely to cause a great degree of scattering of light. Even a cladding component capable of forming fine bubbles in the core-cladding interface is liable to produce an appreciable level of scattering of light, thereby impairing the light-transmitting property of the optical fiber.

It is known heretofore to use as a copolymer for a cladding component vinylidene fluoride-tetrafluoroethylene copolymer (U.S. Pat. No. 3,930,103), fluoroalkyl methacrylate copolymer (U.S. Pat. No. 1,037,498), etc.

Vinylidene fluoride-tetrafluoroethylene copolymer, which still has crystalline in the optical fiber, causes the scattering of light in the core-cladding interface, reducing the light transmitting property. In general, fluoroalkyl methacrylate polymers are amorphous. However, those which ensure sufficient adhesion to the core have a low softening point, whereas those which have a high softening point do not invariably provide good adhesion to the core. The fluoroalkyl methacrylate polymers pose another problem that the polymer prepared under inappropriate polymerization conditions tends to form bubbles in the core-cladding interface.

To mitigate the foregoing drawbacks of optical fibers, a proposal has been made which uses a copolymer prepared by copolymerizing vinylidene fluoride-tetrafluoroethylene copolymer with a specific amount of an unsaturated copolymerizable compound as a third component in an attempt to inhibit the crystallization of the copolymer and to improve the transparency and the adhesion to the core (Japanese Unexamined Patent Publication No. 80758/1979). Also it has been proposed (Japanese Examined Patent Publications Nos. 8321/1981; 8322/1981 and 8323/1981) to increase the softening point by altering the structure of fluoroalkyl groups contained in fluoroalkyl methacrylate polymer.

The method resorting to copolymerization of the terpolymer (Japanese Unexamined Patent Publication No. 80758/1979), however, can not give a transparent copolymer free from crystalline structure. Nor the method involving the structural change of fluoroalkyl groups provides fluoroalkyl methacrylate polymer which is high in softening point and in adhesion to the core. The optical fibers obtained by employing these methods exhibit light-transmitting properties of about 78% at most in terms of white light transmission percentage for a 50 cm length of the optical fiber.

An object of the present invention is to provide plastics optical fibers which have a core-cladding structure ensuring excellent light-transmitting property in visible radiation zone and which involve a low light transmission loss.

Another object of the invention is to provide plastics optical fibers which are prepared by using a cladding component having outstanding heat resistance, chemical stability, mechanical strength and transparency and a low refractive index and which possess a core-cladding structure ensuring excellent light-transmitting properties and involve a low light transmission loss.

Other objects and features of the present invention will become apparent from the following description.

To achieve these objects, the present invention provides plastics optical fibers comprising as a core component a polymer predominantly containing methyl methacrylate and as a cladding component a polymer lower in refractive index than the core component, characterized in that the cladding component is vinylidene fluoride-tetrafluoroethylene copolymer containing 5 to 50% by weight of methyl methacrylate polymer.

The vinylidene fluoride-tetrafluoroethylene copolymer composition containing methyl methacrylate polymer which is used in the present invention have excellent heat resistance, chemical stability and mechanical strength as fluorine-containing polymer, and also possesses very high transparency and low referactive index, hence very useful as a cladding component for optical fibers.

While the vinylidene fluoride-tetrafluoroethylene copolymers useful in this invention cover a wide range of composition, tetrafluoroethylene content in the following range is preferred. The inclusion of tetrafluoroethylene in an amount of less than about 10 mole % gives a copolymer having a high melting point which leads to difficulty in conjugate spinning and to coloring of the fiber in spinning. The tetrafluoroethylene content of over about 40 mole % is likely to result in reduced compatibility with methyl methacrylate polymer and in the production of a copolymer with a high melting point, thereby increasing the amount of light rays scattered in the core-cladding interface and decreasing the spinning ability. Therefore, the content of tetrafluoroethylene preferably amounts to about 10 mole % to about 40 mole % in the copolymer.

The methyl methacrylate polymer to be incorporated in the vinylidene fluoride-tetrafluoroethylene copolymer according to the present invention is a homopolymer of methyl methacrylate or a copolymer of methyl methacrylate monomer and a vinyl-type unsaturated monomer. Preferred examples of useful copolymers are copolymers comprising the combination of methyl methacrylate monomer with a small amount of ethyl methacrylate, propyl methacrylate, butyl methacrylate or like methacrylate monomers; or methyl acrylate, ethyl acrylate, propyl acrylate, butyl acrylate or like acrylate monomers. or styrene, α-methylstyrene, methacrylic acid, fluorine-containing acrylate, fluorine-containing methacrylate or like monomers, etc.

It is preferred to mix less than about 30 mole % of a comonomer with methyl methacrylate monomer. The use of the comonomer in excess of about 30 mole % leads to reduced compatibility with vinylidene fluoride-tetrafluoroethylene copolymer and to a rise in the amount of light transmission loss due to the scattering of light in the optical fiber.

The copolymer composition serving as the cladding component according to this invention must be lower in the refractive index by at least 0.5%, preferably 2%, most preferably 5% than the core component. The amount of the methyl methacrylate polymer to be incorporated in the vinylidene fluoride-tetrafluoroethylene copolymer is an important factor for meeting the refractive index requirement.

With an increase of methyl methacrylate polymer content in vinylidene fluoride-tetrafluoroethylene copolymer, the refractive index is raised substantially in proportion with the increase thereof. The transparency (light transmission ratio) is sharply enhanced by the incorporation of methyl methacrylate polymer in a small amount. The methyl methacrylate polymer content of over about 50% by weight achieves little or no improvement in the transparency, but contributes to a rise in the refractive index, consequently rendering it difficult to maintain the required difference of the refractive index between the core and cladding.

After incorporating methyl methacrylate polymer in vinylidene fluoride-tetrafluoroethylene copolymer, the depressing of melting point (Tm) is obviously observed in the latter copolymer of the cladding component copolymer composition. From a thermodynamic point of view, this phenomenon shows that vinylidene fluoride-tetrafluoroethylene copolymer is sufficiently compatible in amorphous state with methyl methacrylate polymer. Thus the cladding component copolymer composition of this invention is far superior in compatibility with methyl methacrylate polymer to vinylidene fluoride-tetrafluoroethylene copolymer itself heretofore used as a cladding material. For this reason, the cladding component of this invention ensures strikingly higher adhesion to the core component of methyl methacrylate polymer than the prior art cladding material, whereby optical fibers can be produced with outstanding light-transmitting property.

The methyl methacrylate polymer content of less than about 5% by weight in the cladding component copolymer composition results in little or no improvements in compatibility and in adhesion to the core.

More specifically stated, methyl methacrylate polymer must be incorporated into vinylidene fluoride-tetrafluoroethylene copolymer in an amount of about 5 to about 50% by weight based on the entire weight of the copolymer composition.

The impurities and dirt present in the core component polymer and minute voids formed in the plastics optical fiber seriously affect the light-transmitting ability, reducing the light-transmitting property enhanced by the improvements in the transparency of the cladding component and in its adhesion to the core.

According to this invention, higher effects can be achieved by carrying out a method of manufacturing plastics optical fibers completely or substantially free from the impurities and dirt in the core component copolymer and fine voids in the fiber. Preferred examples of such method are those set forth in Japanese Unexamined Patent Publications Nos. 81205/1982 and 84403/1982 and Japanese Patent Application No. 166591/1981 in which the monomers for the core component copolymer are purified and copolymerized and the copolymer is fiberized in a hermetically closed apparatus.

This invention will be described below in more detail with reference to the following examples in which the accompanying drawings are referred to and to which the invention is limited in no way. A tungsten-halogen lamp was used as a light source for determining the light-transmitting property of optical fibers obtained in the examples. And a grating spectrograph was employed to measure the wavelength values.

FIG. 1 is a cross-sectional view of the plastics optical fiber 1 of the present invention which comprises a core portion 2 and a cladding portion 3.

Figure 2:
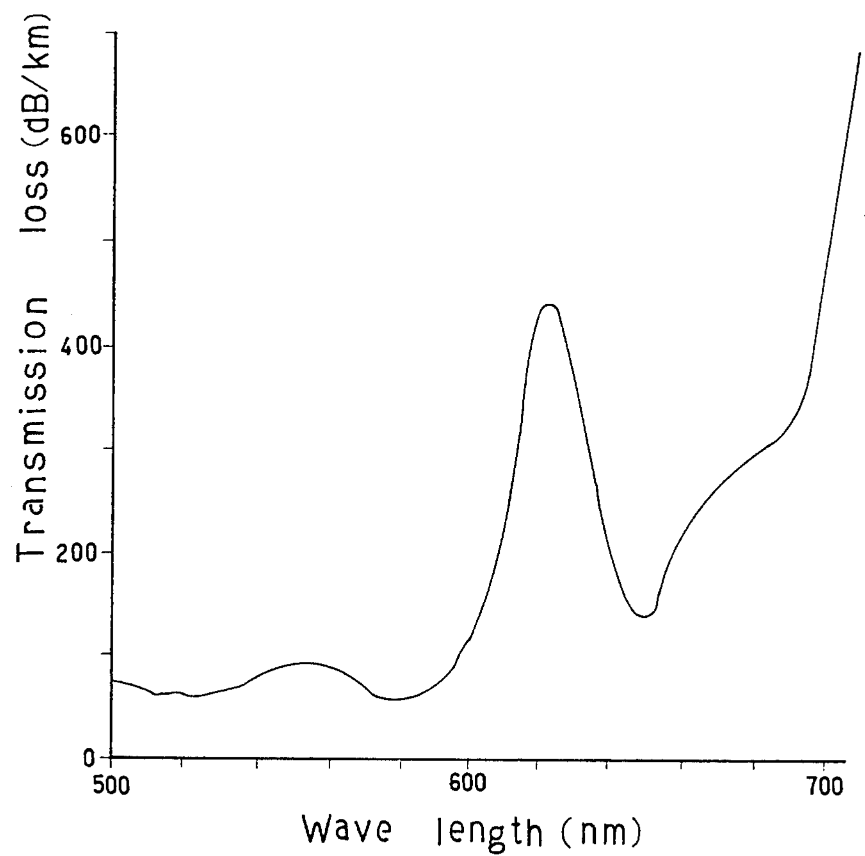

FIG. 2 shows a curve for indicating the results obtained by measuring the light-transmitting property of the plastics optical fiber of the present invention in visible radiation zone which fiber was prepared by conjugate spinning a core component and a cladding component, the core component being methyl methacrylate polymer and the cladding component being vinylidene fluoride-tetrafluoroethylene (80:20 mole ratio of the former to the latter) copolymer composition containing 30% by weight of methyl methacrylate polymer.

EXAMPLE 1

Methyl methacrylate as a monomer was distilled and placed under reduced pressure in a closed polymerization vessel. Azo-tert-butane as a polymerization initiator and n-butyl mercaptan as a chain transfer agent were also distilled and placed in the vessel to mix with the monomer. The mixture was thoroughly stirred to conduct bulk polymerization at 135° C. for 12 hours. Thereafter the polymerization temperature was gradually increased to promote the polymerization, eventually completing the polymerization at 180° C. in 8 hours and giving a core component polymer. The copolymer was fed to an extruder for a core component in a conjugate melt spin device while maintaining the polymer in a molten state.

A cladding component copolymer composition was prepared by kneading 30 parts by weight of methyl methacrylate polymer at 160° C. with use of a roll, adding thereto 70 parts by weight of vinylidene fluoride-tetrafluoroethylene copolymer (80:20 mole ratio of the former to the latter) and thoroughly kneading the mixture. The melt viscosity of the copolymer composition was 110 g/10 min (amount of the composition extruded from an orifice 2 mm in diameter and 8 mm in length at a load of 7 kg/cm$^2$), the melting point Tm was 118° C. (measured by DSC while increasing the temperature at a rate of 10° C./min) and the refractive index was 1.423 (25° C.).

The cladding component copolymer composition was charged to an extuder for a cladding component in the conjugate melt spin device. The core component polymer and the cladding component composition were extruded at 210° C. through a bicomponent spinning head to obtain a plastics optical fiber 1 comprising a core 2 portion having a diameter of 0.5 mm and a cladding portion having a thickness of 0.05 mm, as shown in FIG. 1.

Table 2 is a graph showing the light-transmitting properties of the optical fiber obtained in Example 1. The graph indicates that the minimum light transmission loss value 55 dB/km was obtained at a wavelength of 568 nm, and that the value 60 dB/km was given at 518 nm and the value 128 dB/km at 648 nm. This means that the plastics optical fiber obtained in Example 1 had light-transmitting properties comparable with those of inorganic glass optical fibers containing plastics cladding.

EXAMPLE 2

The procedure of Example 1 was repeated with the exception in the following respect. There were used as a core component a copolymer of 90 mole % of methyl methacrylate and 10 mole % of ethyl acrylate and as a cladding component a composition consisting of 30 parts by weight of methyl methacrylate polymer and 70 parts by weight of vinylidene fluoride-tetrafluoroethylene copolymer (70:30 mole ratio of the former to the latter), the cladding composition being obtained by roll-kneading the methylmethacrylate polymer at a temperature of 160° C. and then adding the vinylidene fluoride-tetrafluoroethylene copolymer while thoroughly kneading. Thus obtained cladding composition was extruded with the core component at a temperature of 200° C.

The plastics optical fiber obtained in this example was found to exhibit the following light transmission loss values: 65 dB/km at a wavelength of 516 nm, 58 dB/km at 566 nm and 130 dB/km at 648 nm. The data show that the optical fiber obtained in Example 2 is markedly excellent in the light-transmitting ability as compared with the minimum light transmission value of 280 dB/nm which a commercial plastics optical fiber displayed.

EXAMPLE 3

A plastics optical fiber was prepared in the same manner as in Example 1 with the exception in the following respect. Forty parts by weight of methyl methacrylate polymer serving as a cladding component was roll-kneaded at 160° C. Thereto added was 60 parts by weight of vinylidene fluoride-tetrafluoroethylene copolymer (80:20 mole ratio of the former to the latter) and the mixture was thoroughly kneaded to obtain a copolymer composition. The plastics optical fiber thus obtained was found to have excellent light-transmitting ability as high as those prepared in Examples 1 to 2.

The plastics optical fiber obtained in this example was left to stand in an electric furnace at 80° C. to be treated for thermal annealing for 500 hours. Thereafter the fiber was checked for change of light-transmitting ability and found to exhibit an increase in light transmission loss value by less than 3%. A plastics optical fiber was prepared by using a methyl methacrylate polymer as a core component and vinylidene fluoride-tetrafluoroethylene copolymer as a cladding component was subjected to the same 500 hour-thermal degradation test at 80° C. as above to compare the difference in light-transmitting ability between before and after the test. The increase in light transmission loss value was over 10%.

As stated above, there can be obtained according to this invention plastics optical fibers containing as a cladding component fluorine-containing copolymer composition which is excellent in transparency and adhesion to the core. The plastics optical fibers of the present invention possess remarkable light-transmitting properties in visible radiation zone which are far more excellent than conventional plastics optical fibers, and the present optical fibers exhibit exceedingly reduced light transmission loss as low as 55 dB/km at a wavelength of 568 nm. The present optical fibers can find applications resorting to the advantages of being large in core diameter, lightweight, ductile, easy to handle, as compared with inorganic glass-type optical fibers. Moreover, the present optical fibers have the features of having higher light transmission properties and also smaller reduction in light-transmitting ability involved in long-term storage at high temperatures than known plastics optical fibers containing as a cladding component vinylidene fluoride-tetrafluoroethylene copolymer.

We claim:

1. Plastic optical fibers comprising as a core component a polymer predominantly containing methyl methacrylate and as a cladding component a copolymer lower in the refractive index than the core component, the plastics optical fibers being characterized by performing conjugate spinning with use of the cladding component which is vinylidene fluoride-tetrafluoroethylene copolymer having incorporated therein 5 to 50% by weight of a polymer predominantly containing methyl methacrylate.

2. Plastics optical fibers as defined in claim 1 in which the vinylidene fluoride-tetrafluoroethylene copolymer contains 10 to 40 mole % of tetrafluoroethylene.

* * * * *